July 6, 1948.　　　　　E. J. POTTS　　　　　2,444,846
DIRIGIBLE HEADLIGHT DEVICE
Filed April 26, 1945　　　　　　　　　　　　3 Sheets-Sheet 1

Inventor
Edward J. Potts.

By Clarence A. O'Brien
and Harvey B. Jacobson
Attorneys

July 6, 1948.　　　　　E. J. POTTS　　　　　2,444,846
DIRIGIBLE HEADLIGHT DEVICE
Filed April 26, 1945　　　　　　　　　　3 Sheets-Sheet 2

Inventor
Edward J. Potts

By Clarence A. O'Brien
and Harvey B. Jacobson
Attorneys

July 6, 1948.　　　　　　　　E. J. POTTS　　　　　　　　2,444,846
DIRIGIBLE HEADLIGHT DEVICE
Filed April 26, 1945　　　　　　　　　　　　　　　　　3 Sheets-Sheet 3

Inventor
Edward J. Potts

By Clarence A. O'Brien
and Harvey B. Jacobson
Attorneys

Patented July 6, 1948

2,444,846

UNITED STATES PATENT OFFICE 2,444,846

DIRIGIBLE HEADLIGHT DEVICE

Edward J. Potts, Stone Mountain, Ga.

Application April 26, 1945, Serial No. 590,355

4 Claims. (Cl. 240—61.2)

This invention relates to a dirigible headlight device for locomotives, and an object of the invention is to provide a device in which the headlight will be automatically turned so that the light will be directed in the proper path when the locomotive is rounding an ordinary curve.

Another important object of the present invention is to provide a dirigible headlight device by means of which the headlight may be automatically turned by connection with a swiveled truck of the locomotive so that the light will be directed in the proper path when the locomotive is rounding an ordinary curve, and in which the headlight may be disconnected from the swiveled truck and turned by manually controlled power-operated means to direct the light in the proper path when the locomotive is rounding unusual curves on which automatic operation will not cause the light to always be directed in the proper path.

A more specific object of the invention contemplates the provision of a dirigible locomotive headlight device that may be readily installed on a locomotive, and one that will operate efficiently and otherwise meet with the requirements for a successful commerical use.

The present application is a continuation, in part, of abandoned application Serial No. 558,895, filed October 16, 1944.

Other objects and features of the invention will become apparent from the following description when considered in connection with the accompanying drawings, in which.

Figure 1:
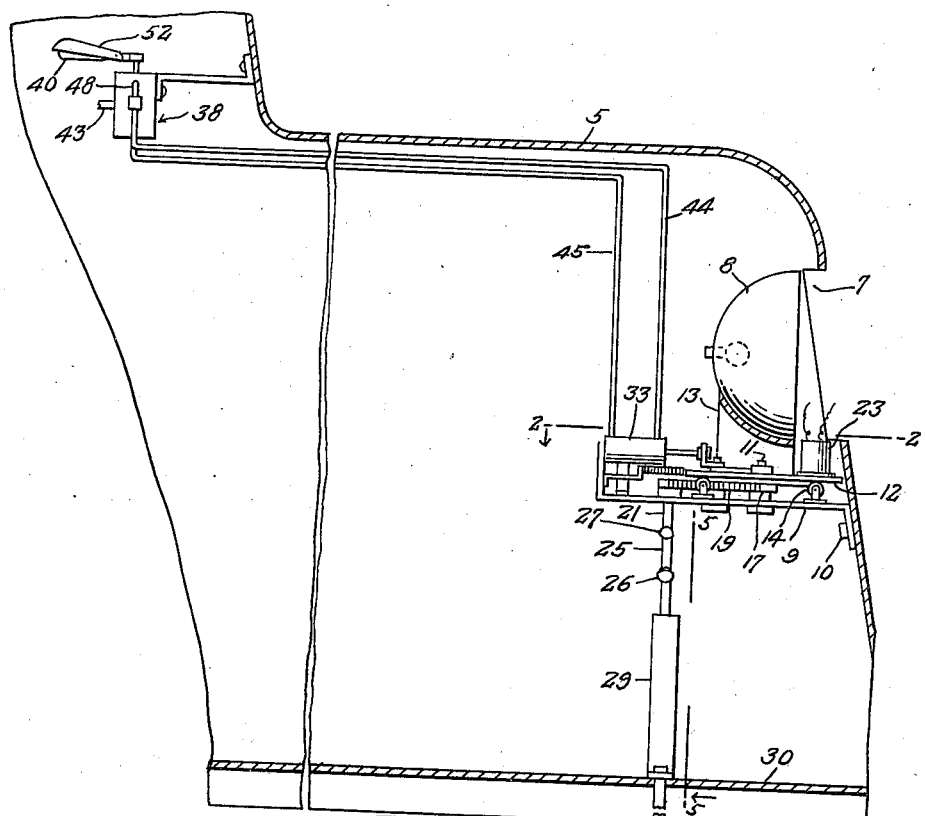
Figure 1 is a fragmentary view, partly in side elevation and partly in vertical longitudinal section, showing an embodiment of the present invention installed upon a locomotive of the streamlined type.

Referring in detail to the drawings, the present dirigible headlight device is shown installed upon a locomotive of the streamlined type having a body 5 and a front swiveled truck 6. As shown, the body 5 is provided at the front with an opening 7, and the headlight 8 is mounted within the body 5 directly behind and in registry with the opening 7 so as to direct the rays of light forwardly through the latter onto the track in advance of the locomotive.

A horizontal bracket plate 9 is bolted or otherwise secured at 10 to the front of the body 5 so as to be disposed within the front of the latter a slight distance below the opening 7. Pivotally mounted at 11 in spaced relation to and above the bracket plate 9 for rotation about a vertical axis is a support for the headlight 8 including a base plate 12 and a bracket 13 fixed on the plate 12 and having the headlight 8 secured thereon. A circular series of spaced rollers 14 is provided upon the bracket plate 9 in concentric and surrounding relation to the pivot 11, and the plate 12 of the headlight support rests upon these rollers so as to be supported by the latter for free rotation. Pivoted on the pivot 11 and projecting forwardly from the latter in contact with the under face of the plate 12 is a crank plate 15 having an opening in the forward free end thereof at 16. The pivoted end of crank plate 15 is fixed upon a segment pinion 17 which is also journaled on the pivot 11 between the crank plate 15 and the bracket plate 9. Journaled at 18 on the plate 9 behind the pivot 11 is a gear 19 which meshes with and is interposed between the segment pinion 17 and a further segment pinion 20 secured on the upper end of a shaft 21 that is journaled in and extends downwardly through the bracket plate 9. A pin 22 constituting the projecting end of the core of a solenoid 23 mounted on the plate 12 projects downwardly through an opening of plate 12 and into the opening 16 of crank plate 15 so as to cause the plate 12 to rotate with the crank plate 15. The pin or core 22 is normally projected and is adapted to be retracted upwardly from the opening 16 when the coil of solenoid 23 is energized. Obviously, when the pin 22 is withdrawn from opening 16, the crank plate 15 is allowed to turn relative to the plate 12 without rotating the latter and the head lamp 8 mounted thereon.

Figure 5:
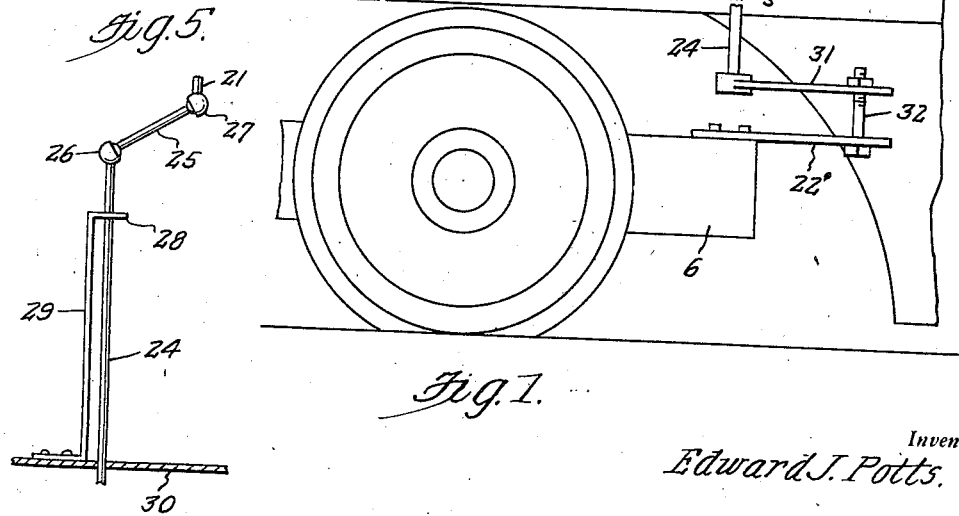
Figure 5 is a fragmentary vertical section taken on line 5—5 of Figure 1.
Figure 2:
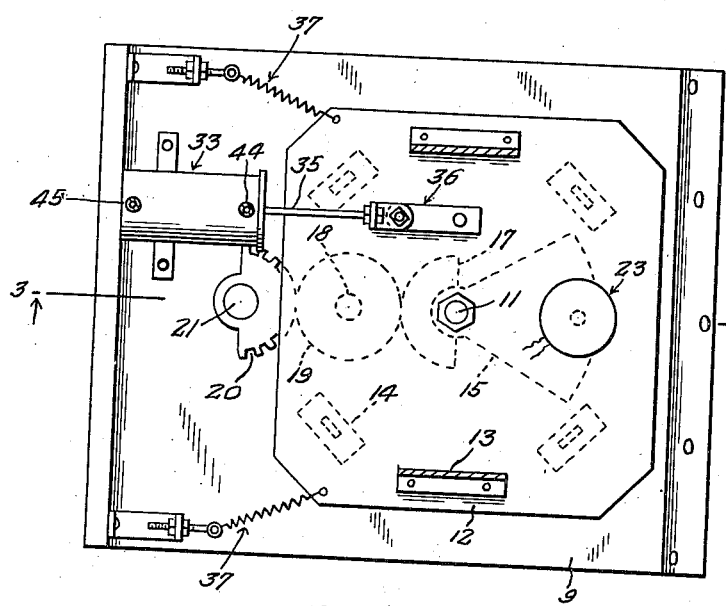
Figure 2 is an enlarged horizontal section taken on line 2—2 of Figure 1, but with the body of the locomotive omitted.

A horizontal bracket arm 22' is bolted to the front of the truck 6 so as to project forwardly from the latter. A vertical shaft 24 is disposed in a vertical plane to one side of the shaft 21, as shown in Figure 5. An intermediate shaft 25 respectively has its opposite ends connected by universal joints 26 and 27 with the upper end of shaft 24 and the lower end of shaft 21. This construction is equivalent to flexible shafting and makes it possible to position the shaft 21 midway between the sides of locomotive body and operatively connect it with the bracket arm 22' even though the locomotive construction is such that said bracket arm 22' must be secured to the truck 6 to one side of the longitudinal center of the locomotive. Shaft 24 is journaled in a bearing 28 carried by the upper end of a bracket 29 mounted upon the floor 30 of the locomotive. A forwardly projecting crank arm 31 is secured on the lower end portion of shaft 24, and a nutted bolt 32 operatively connects the bracket arm 22' with the crank arm 31 so that turning of the truck 6 will effect turning of shaft 24 for rotating plate 12 through the gearing described. By placing the bolt 32 the required distance from shaft 24, the proper degree of turning can be had according to the particular type of locomotive on which the invention is installed.

Mounted upon the bracket plate 9 rearwardly of the plate 12 is a reciprocating fluid pressure motor 33 of the double-acting type including a cylinder having a piston 34 reciprocable therein. The motor 33 is disposed to one side of the pivot 11, and the piston 34 has a forwardly projecting piston rod 35 which is operatively connected at 36 with the plate 12 eccentrically of the latter. The arrangement is such that when the piston 34 is moved rearwardly, plate 12 is turned to turn the head lamp 11 to the left, and when the piston is moved forwardly, plate 12 and the headlight are turned to the right. Adjustable spring means 37 are provided for normally yieldingly positioning the plate 12 so that the headlight is arranged to direct the rays of light straight ahead.

Arranged within the engineer's cab of the locomotive is a valve 38 for controlling the operation of motor 33, said valve including a casing having a rotatable valve member 39 therein which is provided with an operating handle 40. At one level, the valve member 39 is provided with a pair of arcuate passages 41 and 42 and the casing has four equally spaced ports, one of which communicates with a fluid pressure supply pipe 43, another of which is connected by a pipe 44 with the front end of motor 33, another of which is connected by a pipe 45 with the rear end of motor 33, and the remaining one of which is indicated at 46 and opens to the atmosphere. The arrangement is such that when the valve member 39 is turned to the position of Figure 7, fluid under pressure is admitted to the rear of the motor 33 so as to move the piston 34 forwardly and turn the headlight to the right. The arrangement is also such that when the valve member 39 is turned to the position of Figure 8, fluid under pressure is admitted to the front of cylinder 33 so as to move the piston 34 rearwardly and cause the headlight to be turned to the left. The degree and speed of turning movement of the headlight may be regulated by proper manipulation of the valve, and safety pressure relief valves may be employed in the pipes 44 and 45 so as to release the pressure when the piston 34 has reached either limit of its movement, even though the valve member 39 is not promptly actuated to discontinue the supply of fluid under pressure to the motor 33. Any suitable means may be provided for limiting turning movement of the plate 12, such as predetermined length of the cylinder of motor 33 and corresponding limiting of the stroke of piston 34.

Figure 7:
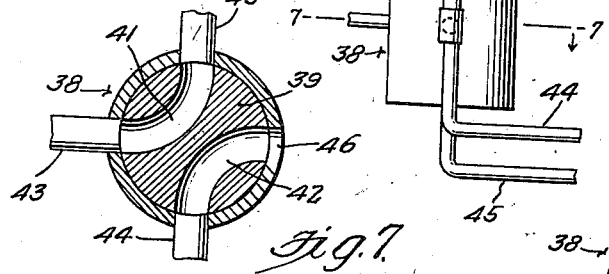
Figure 7 is an enlarged horizontal section taken on line 7—7 of Figure 6, with the movable member of the valve in position to admit fluid under pressure to the rear end of the fluid pressure motor and to simultaneously exhaust the fluid pressure from the front end of said motor.
Figure 9:
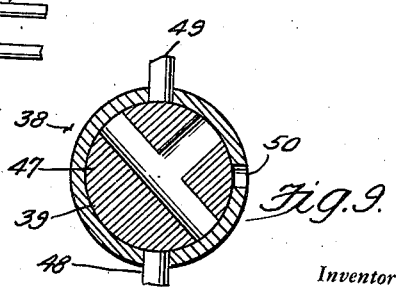
Figure 9 is a horizontal section taken on line 9—9 of Figure 6.
Figure 8:
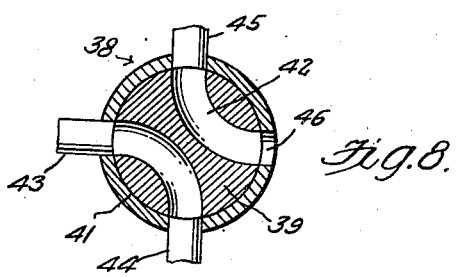
Figure 8 is a view similar to Figure 7, with the movable valve member positioned to admit fluid pressure to the front end of the fluid pressure motor and to exhaust fluid pressure from the rear end of said motor.
Figure 4:
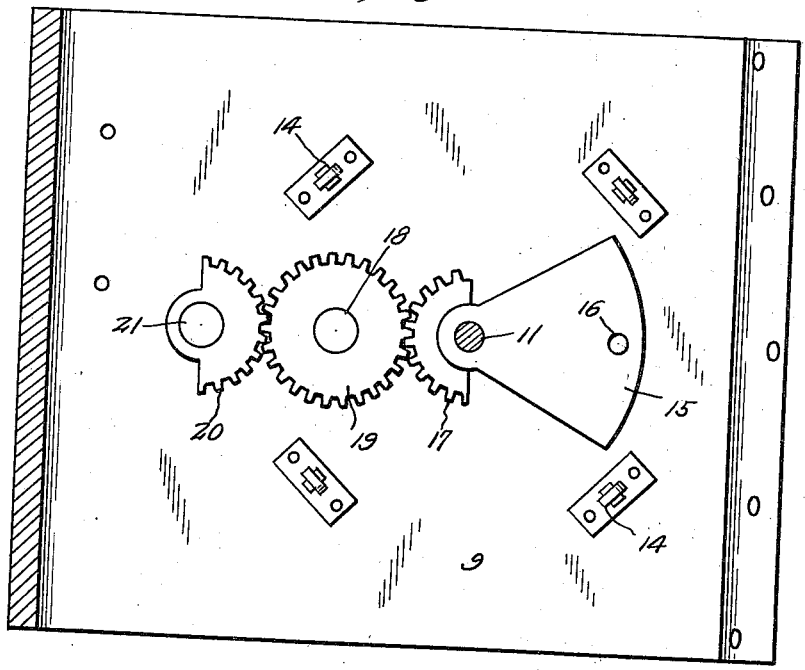
Figure 4 is a horizontal section taken on line 4—4 of Figure 3.
Figure 3:
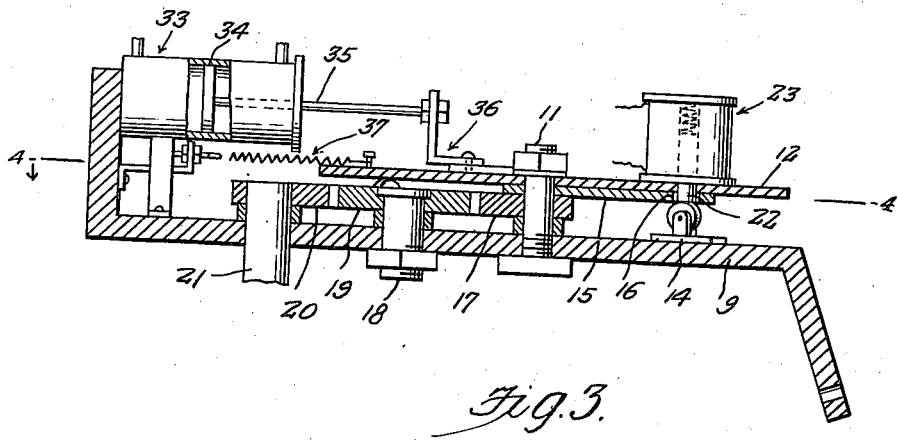
Figure 3 is a vertical section taken on line 3—3 of Figure 2 and partly broken away and in section.

At another level, the valve member 39 is provided with a T-shaped passage 47 and the casing has three equally spaced ports, one of which is connected to the pipe 44 by a branch 48, another of which is connected to the pipe 45 by a branch 49, and the remaining one of which is indicated at 50 and communicates with the atmosphere. The arrangement is such that when the valve member 39 is turned to position the ports 41 and 42 out of communication with the pipes 43, 44 and 45, the passage 47 will connect the branches 48 and 49 with the port 50 so as to exhaust the pressure fluid from both ends of the motor 33, thereby permitting free movement of piston 34 so that automatic actuation of the headlight may be had by connection with the swivel truck 6 and by engagement of pin 22 in opening 16 of plate 12. Of course, when valve member 39 is positioned as shown in Figure 7, pipe 44 is in communication with exhaust port 46 so as to exhaust the fluid from the front end of the motor 33, while pipe 45 is connected with exhaust port 46 to exhaust the fluid from the rear end of motor 33 when the valve member 39 is positioned as shown in Figure 8.

Figure 6:
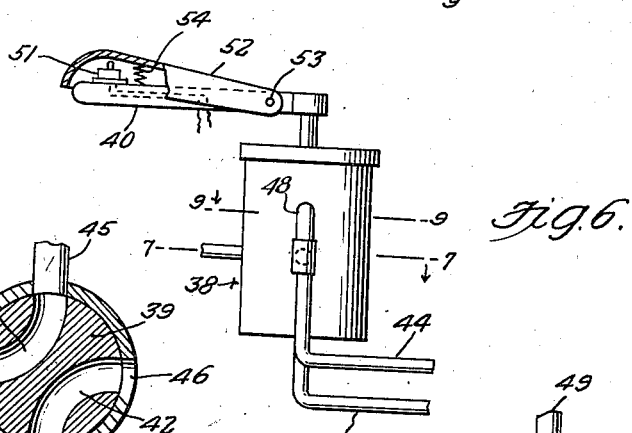
Figure 6 is an enlarged side elevational view of the control valve and switch device forming part of the construction shown in Figure 1.
Figure 10:
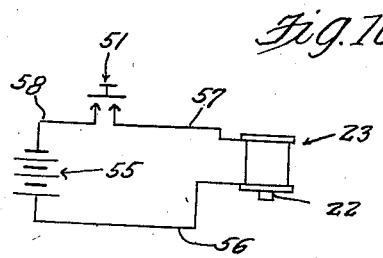
Figure 10 is a wiring diagram showing the circuit arrangement for the solenoid employed to connect and disconnect the headlight with respect to the swivel truck of the locomotive.

In order to conveniently normally open the circuit of solenoid 23 and to manually close said circuit, a switch device is associated with handle 40 of valve 38, as shown more clearly in Figure 6. As shown in the latter figure, a push-button switch 51 is mounted upon the free end of handle 40, and overlying this push-button switch is the rear end portion of a hollow or concave lever 52 pivoted at its forward end, as at 53, to the handle 40 adjacent the stem of valve member 39. Lever 52 is thus mounted for vertical swinging movement and is normally yieldingly elevated by a spring 54 interposed between handle 40 and lever 52. As shown in Figure 10, the coil of solenoid 23 is connected at one side to one side of a battery or other source of current 55 by a wire 56, the other side of said coil being connected by a wire 57 to one contact of the switch 51. The other contact of switch 51 is connected to the other side of battery or source of current 55 by a wire 58. The arrangement is such that spring 54 normally elevates the lever 52 so as to permit the switch 51 to assume its normally open condition whereby the coil of solenoid 23 is de-energized and the core or pin 22 is projected to couple the plate 12 and crank plate 15. Assuming that the valve member 39 is positioned to exhaust both ends of motor 33, the normal arrangement will be such that the headlight is automatically turned by operative connection with the swivel truck 6, as desirable when traveling straight ahead or negotiating ordinary turns or curves. However, unusual curves in a railway track are often encountered in which the automatic turning of the headlight is not accurate or satisfactory. At such times, it is desirable to discontinue use of the automatic headlight actuation and to turn the headlight by means of motor 33 under control of valve 38. To do this, it is simply necessary to grasp the handle 40 and lever 52 of valve 38, pressing downwardly on lever 52 so as to operate switch 51 for closing the circuit of the coil of solenoid 23. This causes the pin 22 to be retracted from opening 16 so that supporting plate 12 may be turned independently of the crank plate 15 and the elements operatively connecting it with the swivel truck 6 of the locomotive. While holding the lever 52 depressed, the valve member 39 may be turned to effect actuation of motor 33 and turning of the headlight 8 in the desired direction and to the desired degree or extent. When power actuation of the plate 12 is no longer desired, the valve 38 may be set to exhaust fluid from both ends of the motor 33 and lever 52 may be released to de-energize the coil of solenoid 23 and permit the pin 22 to again engage in opening 16. The latter will cause the plate 12 to again be coupled with crank plate 15 so that automatic actuation of the headlight will be effected by connection of the same with the swiveled truck of the locomotive.

While I have illustrated a particular operating connection between the plate 12 and the truck 6, and while I have shown the invention installed upon a locomotive of the streamlined type, it will be obvious that the invention may be modified within certain limits as to details of the operating connection between said plate 12 and truck 6 and as to the manner of installing the invention upon the locomotive, depending upon the type of the latter. Only minor changes and exercise of skill is required to adapt the invention for use upon a locomotive of the ordinary or non-streamlined type.

From the foregoing description, it is believed that the construction, operation and advantages of the present invention will be readily understood and appreciated by those skilled in the art.

What I claim is:

1. In combination with the body, the engineer's cab and the swiveled front truck of a locomotive, a horizontal bracket mounted on the locomotive body, a headlight support mounted on said bracket to turn about a vertical axis, means operatively connecting said truck to said headlight support including a truck-actuated member mounted between said bracket and said support to turn about said vertical axis and a releasable element normally connecting said member to said support, manually controlled power-operated means for releasing said element, and a motor mounted on said bracket, said motor being manually controlled from the engineer's cab and operatively connected to said support for selectively turning said support in either direction.

2. In combination with the body, the engineer's cab and the swiveled front truck of a locomotive, a horizontal bracket mounted on the locomotive body, a headlight support mounted on said bracket to turn about a vertical axis, means operatively connecting said truck to said headlight support including a truck-actuated member mounted between said bracket and said support to turn about said vertical axis and a releasable element normally connecting said member to said support, electrically-operated means mounted on said support for releasing said element, double-acting fluid pressure motor operatively connected to said support and mounted on said bracket for turning said support in either direction, and manually operable means located in the engineer's cab for controlling said electrically-operated means and said fluid pressure motor.

3. The construction defined in claim 2, wherein a valve is provided for controlling the motor including a movable valve member having an operating handle, and wherein said electrically-operated means includes a normally open switch mounted upon the handle of said valve so as to be closed upon gripping the handle to actuate the valve.

4. The construction defined in claim 2, wherein a valve is provided for controlling the motor including a movable valve member having an operating handle, and wherein said electrically-operated means includes a normally open switch mounted upon the handle of said valve so as to be closed upon gripping the handle to actuate the valve, in combination with a vertically swinging lever pivoted to the valve handle and depressible for closing the switch, and a spring for normally elevating said lever to permit opening of the switch.

EDWARD J. POTTS.

REFERENCES CITED

The following references are of record in the file of this patent:

UNITED STATES PATENTS

| Number | Name | Date |
|---|---|---|
| 1,012,954 | Williams | Dec. 26, 1911 |
| 1,170,300 | McCarthy | Feb. 1, 1916 |
| 1,324,655 | De Filippis | Dec. 9, 1919 |
| 1,333,205 | Fitzgerald et al. | Mar. 4, 1920 |
| 1,354,062 | Payne | Sept. 28, 1920 |
| 1,555,681 | Looney | Sept. 29, 1925 |
| 1,750,077 | Welch | Mar. 11, 1930 |